United States Patent [19]
Graham

[11] Patent Number: 5,789,479
[45] Date of Patent: Aug. 4, 1998

[54] SETTLED SOLIDS PROCESS FOR PREPARING POLYESTER COPOLYMER RESIN

[76] Inventor: Lonzell Graham, 302 Vesper Cir., Mauldin, S.C. 29662

[21] Appl. No.: 744,761

[22] Filed: Nov. 6, 1996

Related U.S. Application Data

[60] Provisional application No. 60/007,303 Nov. 6, 1995.
[51] Int. Cl.$^6$ ................................................. C08L 67/00
[52] U.S. Cl. .......................... 524/845; 524/800; 524/801; 524/845; 210/767; 210/770; 210/806
[58] Field of Search ............................ 524/800, 801, 524/845; 210/767, 770, 806

[56] References Cited

U.S. PATENT DOCUMENTS

| | | | |
|---|---|---|---|
| 3,719,030 | 3/1973 | Blankemeyer et al. | 95/286 |
| 3,970,628 | 7/1976 | Connelly et al. | 523/411 |
| 4,480,026 | 10/1984 | Ashcraft et al. | 430/510 |
| 4,518,737 | 5/1985 | Traut | 524/413 |
| 5,342,878 | 8/1994 | Das et al. | 524/558 |
| 5,430,078 | 7/1995 | Hoppe-Hoeffler et al. | 523/414 |
| 5,461,089 | 10/1995 | Handyside et al. | 523/171 |
| 5,464,897 | 11/1995 | Das et al. | 524/458 |
| 5,468,471 | 11/1995 | Zecchino et al. | 424/59 |
| 5,641,829 | 6/1997 | Das et al. | 524/507 |

*Primary Examiner*—Samuel A. Acquah
*Attorney, Agent, or Firm*—Michael I. Kroll

[57] ABSTRACT

The present invention relates to a process for preparing a dispersion of high grade polyester copolymer resin in water comprising 1) combining a crude polyester copolymer resin, having particles of various sizes, with water; 2) heating and agitating the resin/water mixture; 3) cooling the mixture; 4) allowing the mixture to stand undisturbed so that the largest, undispersed particles settle out as a sediment; 5) removing the sediment; and 6) continuously filtering the mixture, using progressively finer filters, leaving only the finest size particles. By using a plurality of filters and sequentially finer filter mesh sizes, a high grade product is attained.

26 Claims, 8 Drawing Sheets

1. Batch Run #1   Solids Settling Method   Batches

| Property | Specification | A | B | C | D | E | F |
|---|---|---|---|---|---|---|---|
| Total Solid % | 12.0-15.0 | 13.1 | 13.3 | 12.9 | 13.5 | 13.0 | 12.8 |
| PH (5% Solution) | 6.3 - 7.5 | 6.5 | 6.3 | 6.5 | 6.4 | 6.5 | 6.3 |
| Specific Gravity (25%) | 1.020 - 1.031 | 1.029 | 1.030 | 1.031 | 1.028 | 1.03 | 1.029 |
| Turbidity (2% Solution) | 300 NTU | 130 | 150 | 125 | 135 | 165 | 180 |

5,789,479

1

SETTLED SOLIDS PROCESS FOR PREPARING POLYESTER COPOLYMER RESIN

CROSS-REFERENCE TO RELATED APPLICATION

This application derives from and claims the benefit of U.S. Provisional Application Ser. No. 60/007,303, filed on 6 Nov., 1995.

BACKGROUND OF THE INVENTION

1. Field of the Invention

The instant invention relates generally to processes for preparing a polyester copolymer resin and more specifically it relates to a process for dispersing a crude polyester copolymer resin and separating out, via sedimentation followed by continuous multi-stage filtration, the smallest size particles present in the crude starting material.

2. Description of the Prior Art

It is known in the art to utilize filter systems to separate polyester copolymer resin dispersions. Speaking generally, these methods use inert filter aides such as diatomaceous earth. The most common filter press design consists of alternate plates and frames hung on a rack and forced tightly together with a hydraulic closing mechanism. Feed slurry is then pumped to the press under pressure. As the filtration proceeds, filter cakes build up on the filter cloths until the cakes form a nearly solid mass, requiring that they be removed for further processing. With these processes, the finished product (the polyester resin) is obtained in the form of the filter cake removed from the filter press, and the filtrate solution is the by-product. In the instant invention, however, the filtrate is the desired product and the removed sediment is the by-product.

SUMMARY OF THE INVENTION

The present invention is concerned with a process for preparing a dispersion of high grade polyester copolymer resin in water comprising 1) combining a crude polyester copolymer resin, having particles of various sizes, with water; 2) heating and agitating the resin/water mixture; 3) cooling the mixture; 4) allowing the mixture to stand undisturbed so that the largest, undispersed particles settle out as a sediment; 5) removing the sediment; and 6) continuously filtering the mixture, using progressively finer filters, leaving only the finest size particles. By using a plurality of filters and sequentially finer filter mesh sizes, a high grade product is attained.

A primary object of the present invention is to provide a process for preparing a dispersion of high grade polyester copolymer resin in water.

Another object of the present invention is to provide a process for preparing a dispersion of high grade polyester copolymer resin in water via sedimentation followed by a continuous serial filtration system.

An additional object of the present invention is to provide a process for preparing a dispersion of high grade polyester copolymer resin in water, which resin is suitable for use in manufacturing PET films.

A further object of the present invention is to provide a process for preparing a dispersion of high grade polyester copolymer resin in water which is environmentally friendly.

A still further object of the present invention is to provide a process for preparing a dispersion of high grade polyester

2 copolymer resin in water that is easy and economical to implement using existing machinery.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS UTILIZED IN THE DRAWINGS 10 mixing kettle for dispersing copolymer resin 12 in water 14

12 crude copolymer resin from which an extremely fine, high quality resin is to be extracted 14 water 16 dispersion of resin 12 in water 14, contained in mixing kettle 10

18 application of heat plus agitation to the resin 12 and water 14 mixture within mixing kettle 10 acts to create dispersion 16, which is then cooled prior to filtering 20 conduits through which the cooled dispersion 16 is pumped to the settling tanks 22

22 settling tanks in which larger particles of copolymer resin 12 precipitate out of dispersion 16

24 precipitate, made up of larger copolymer particles from dispersion 26 supernatant, a lower turbidity dispersion which results from precipitation of larger copolymer particles 24

28 conduits through which precipitate 24 is drained out of settling tanks 22

30 conduits through which the lower turbidity dispersion 26 is pumped from the settling tanks 22 to the filter system 32

32 sequential filter system 34 conduit through which the filtered lower turbidity dispersion 26 travels from the filter system 32 to a holding tank 36

36 holding tank for containing dispersion 26 during continuous filtering process through filter system 32

38 filtered dispersion contained within holding tank 36

40 conduit through which dispersion 38 is pumped to filter system 32

42 conduit through which dispersion 38 is pumped for further processing, after attaining sufficiently low turbidity 50 initially, the crude copolymer resin 12 is combined with water 14 in the mixing kettle 10

52 the resin 12 and water 14 mixture is heated, preferably to a temperature of from about 180° to 200° F.

54 the resin 12 and water 14 mixture is thoroughly agitated in order create dispersion 16

56 the dispersion 16 is then cooled, preferably to a temperature of from about 65° to 90° F.

58 the cooled dispersion 16 is transferred, via conduit 20, to settling tanks 22

60 the dispersion is allowed to settle, so that the larger resin particles settle out forming sediment 24

62 supernatant 26, a dispersion of smaller particle copolymer resin in water, is separated from the precipitate 24

64 supernatant dispersion 26 is then filtered through a sequential filter system 32 in order to filter out the larger, unwanted particles of resin 12

66 the turbidity of the resultant dispersion is measured to see if it is within desired guidelines; the less turbid the dispersion, the finer the particle size of the resin within the dispersion 68 if the turbidity is higher than desired, filtering is continued, either with the same filter system, or through a filter system of finer mesh 70 if the turbidity is within the desired range, the particle size of the resin within the dispersion is acceptable and the remaining resin in dispersion is separated from the supernatant liquid and packaged for use 80 y-axis of graph represents turbidity measurement, measured in turbidity units (NTU) of dispersion after various stages of filtering 82 micron sizes of filters utilized in the various filter systems illustrated, with the first sequential filter system represented by the top number and the second sequential filter system represented by the bottom number 84 total number of filter bags used in each filter system, with the first number representing the number of filter bags used in the first sequential filter system and the second number representing the number of filter bags used in the second sequential filter system 86 filtering time in minutes for each filtering run 88 first filtering run, using two 100 micron filter bags for 150 minutes 90 second filtering run, using one 75 micron and one 50 micron filter bag for 90 minutes 92 third filtering run, using three 50 micron and three 25 micron filter bags for 210 minutes 94 fourth filtering run, using five 25 micron and five 10 micron filter bags for 120 minutes 96 fifth filtering run, using three 10 micron and three 5 micron filter bags for 150 minutes 98 sixth filtering run, using two 5 micron filter bags for 60 minutes 100 seventh filtering run, using one 2 micron and one 1 micron filter bag 102 the initial step of the process is to produce a dispersion of the crude copolymer resin in water 104 the dispesion is transferred to a settling tank for precipitation of the larger resin particles 108 the dispersion of smaller resin particles in water is filtered until the dispersion achieves a predetermined turbidity 122 the mixture of resin in water is heated to assist dispersion 124 the mixture of resin in water is agitated to assist dispersion 126 the mixture of resin in water is removed from heat and agitation and allowed to remain still in order that the undispersed, larger resin particles precipitate out as a sediment

DETAILED DESCRIPTION OF THE PREFERRED EMBODIMENTS

Turning now descriptively to the drawings, in which similar reference characters denote similar elements throughout the several views, the Figures illustrate a process for for preparing a dispersion of high grade polyester copolymer resin in water.

Figure 1:
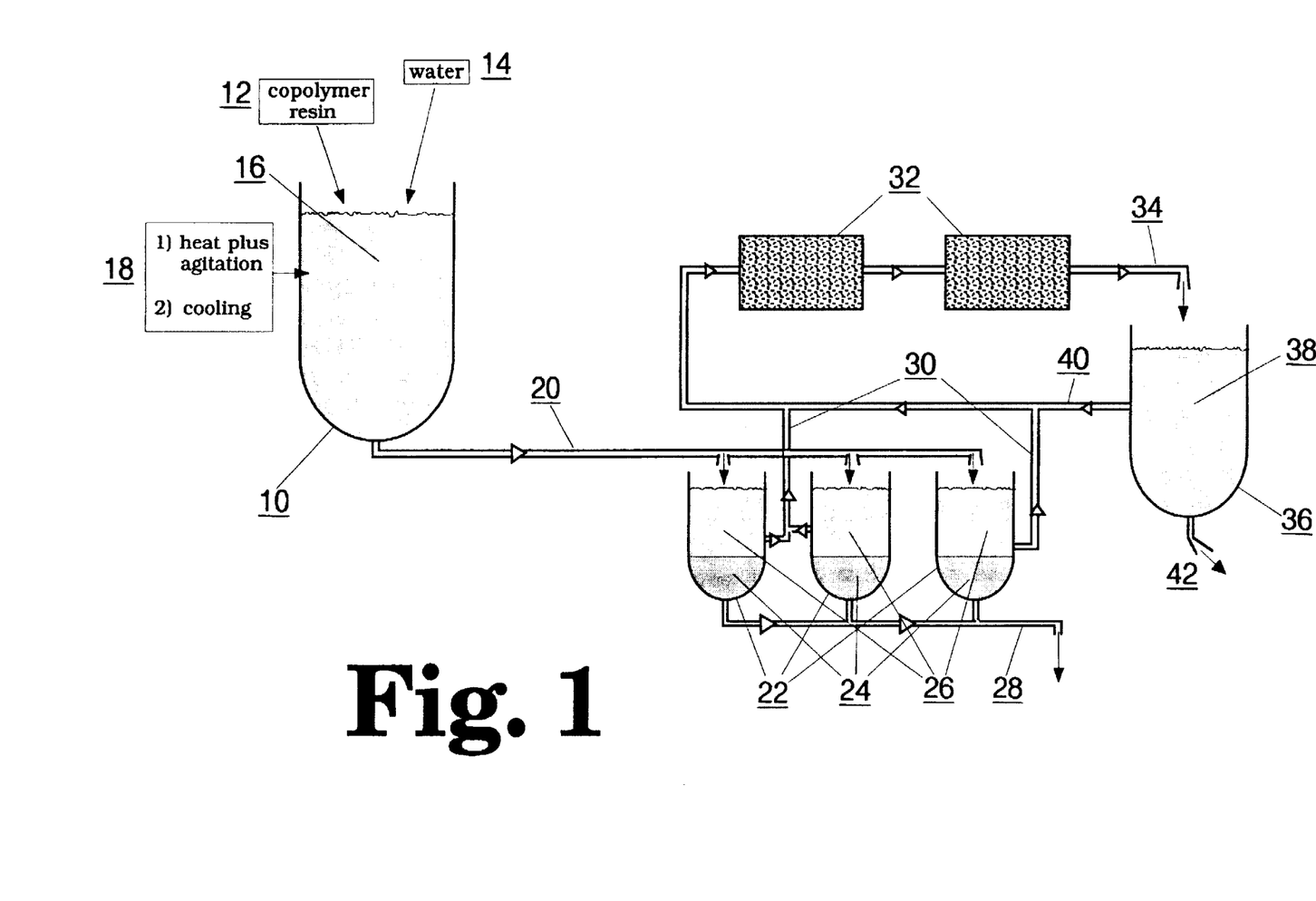
FIG. 1 is a diagrammatic view of an apparatus for practicing the process of the present invention.
Figure 2:
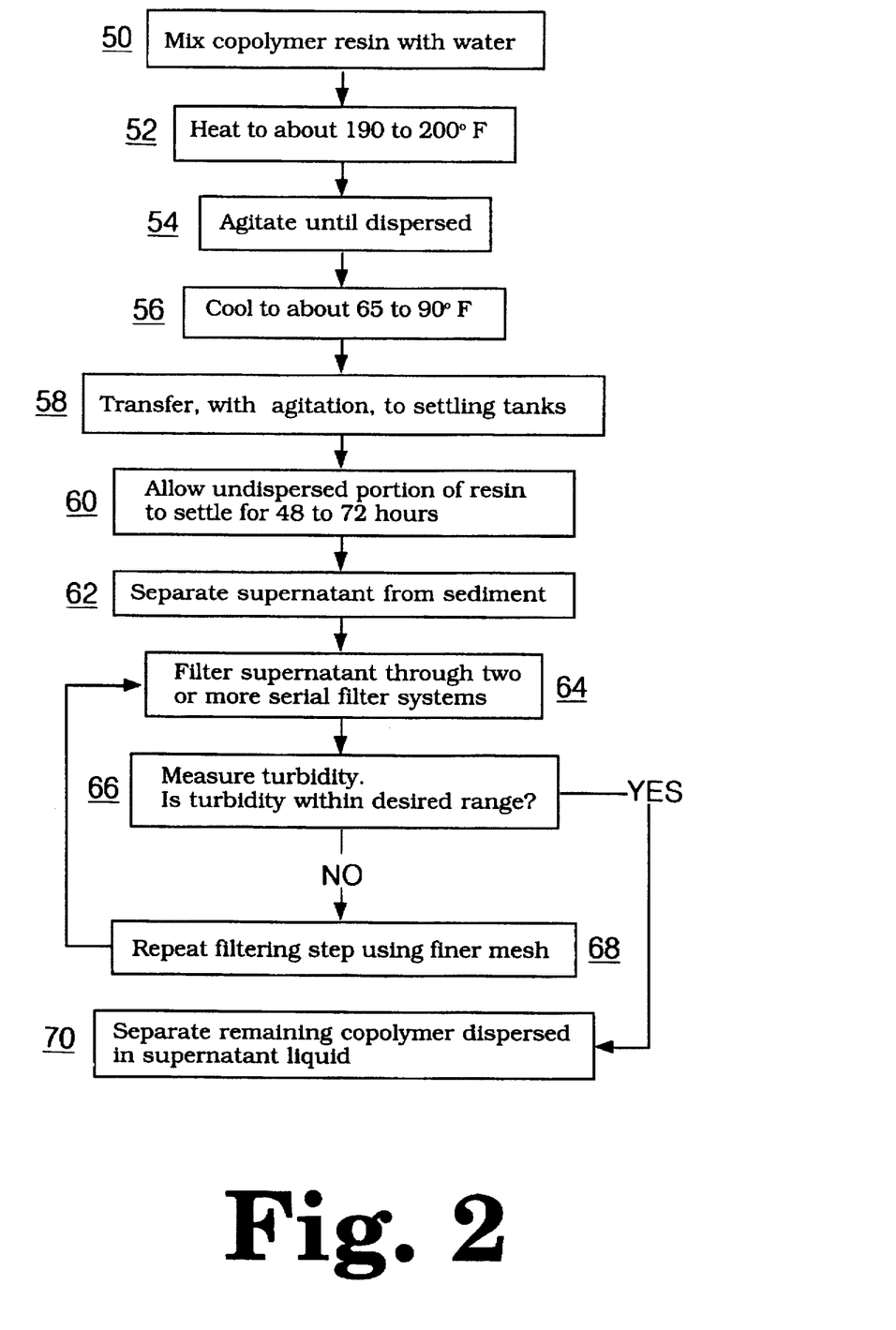
FIG. 2 is a flowchart illustrating the preferred, detailed steps of the process of the present invention.
Figure 3:
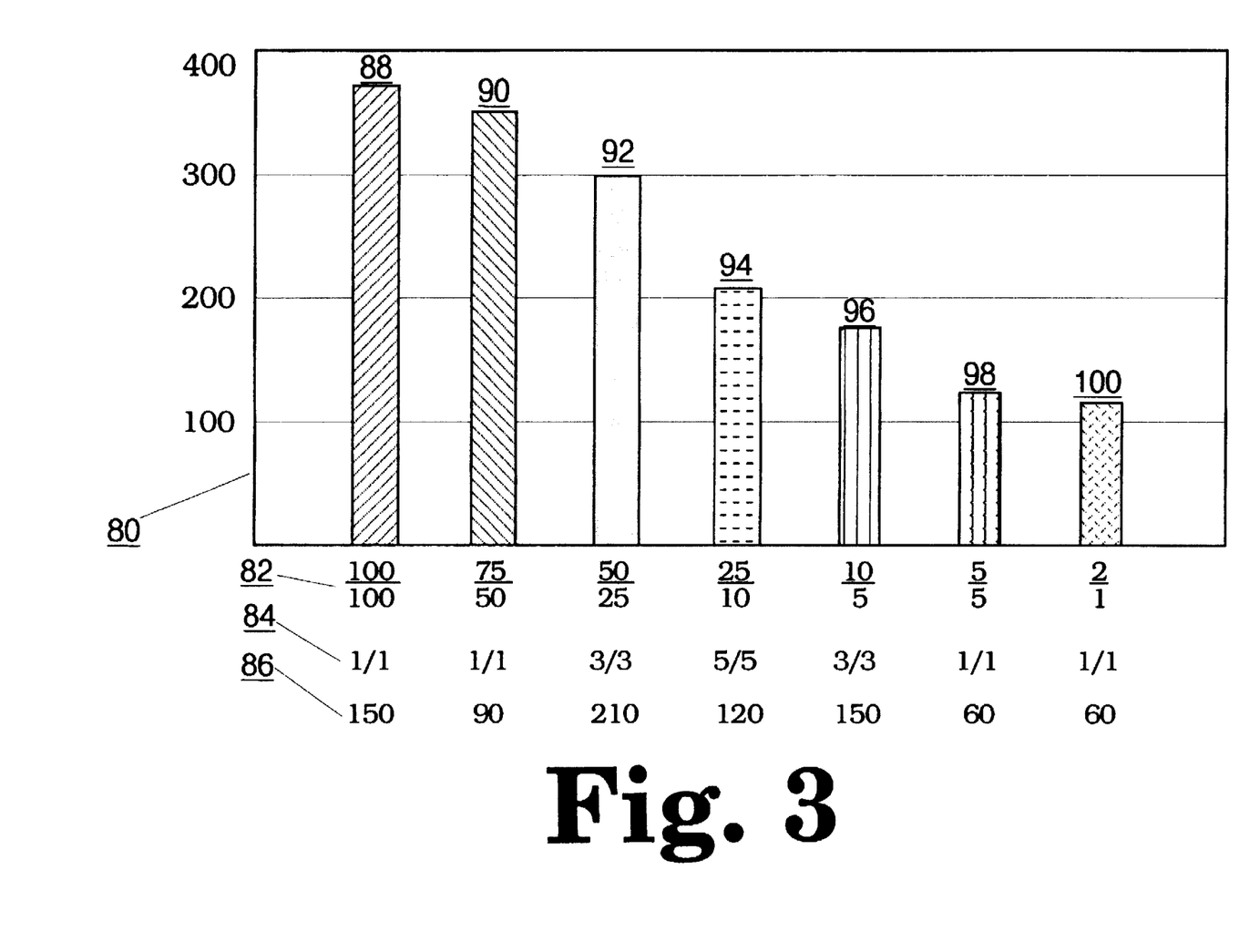
FIG. 3 is a graph illustrating how the turbidity of the dispersion decreases with sequential filtering.
Figure 4:
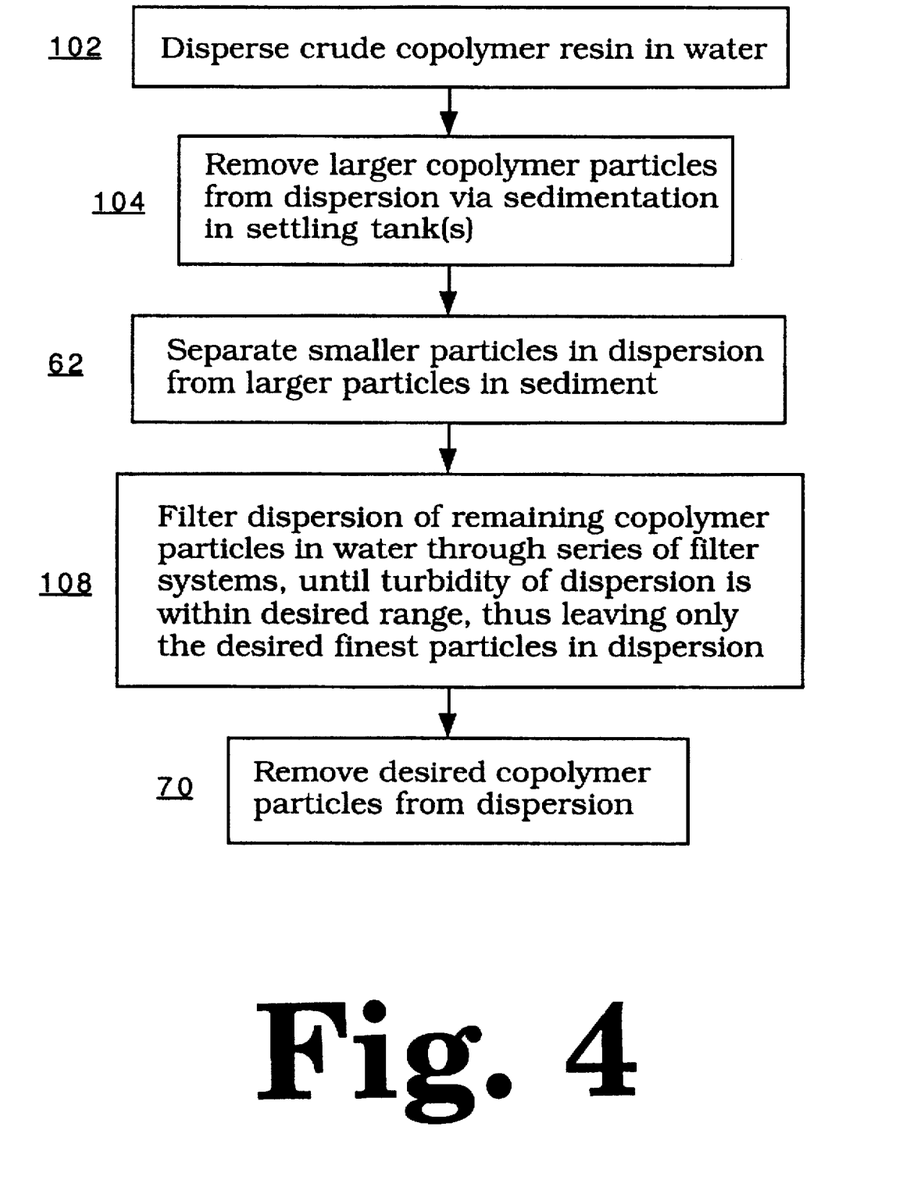
FIG. 4 is a flowchart illustrating, in general terms, the steps of the process of the present invention.
Figure 5:
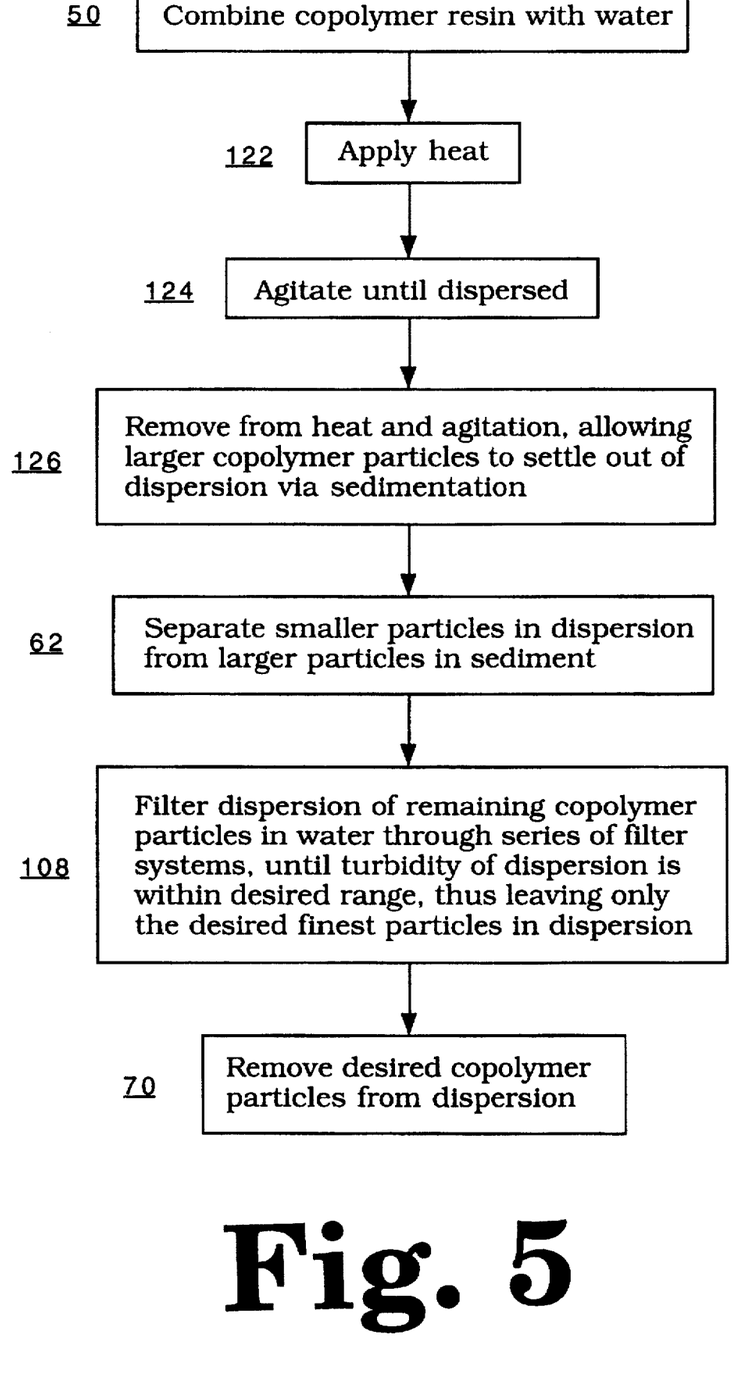
FIG. 5 is a flowchart illustrating, in intermediately detailed terms, the steps of the process of the present invention.
Figure 6:
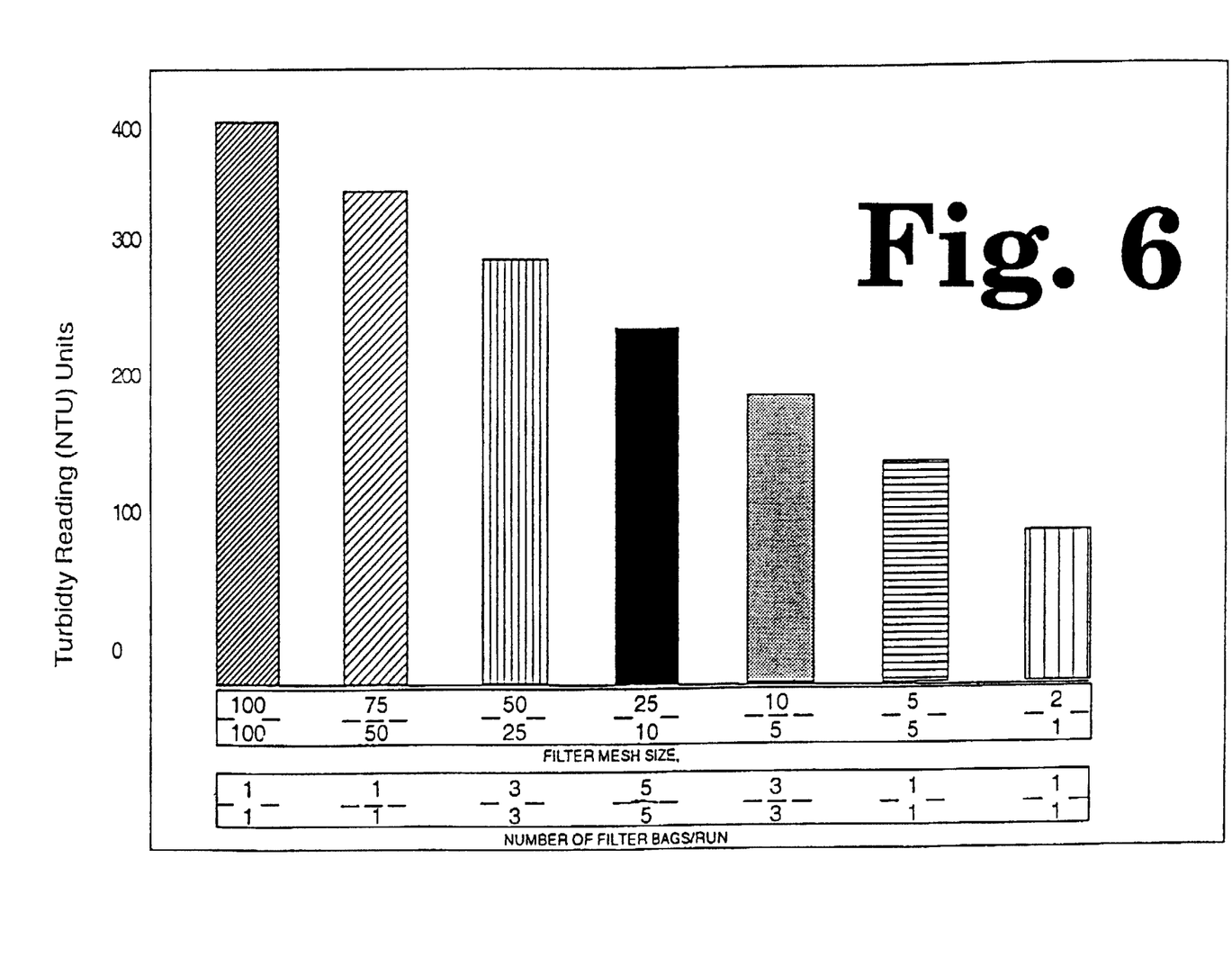
FIG. 6 is a bar graph illustrating the relationship between the turbidity of the polymer/water mixture and the filter sequence being utilized.
Figure 7:
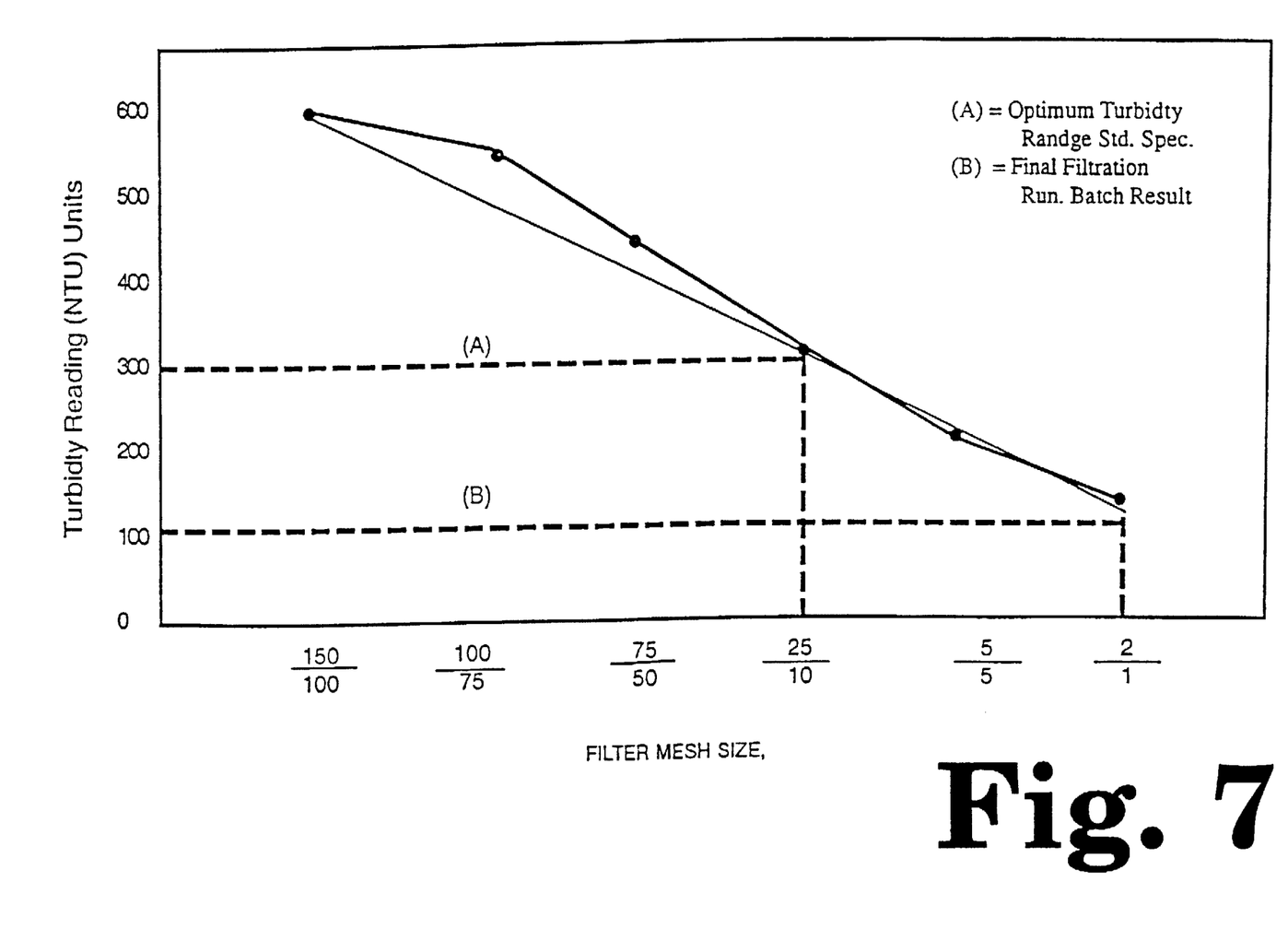
FIG. 7 is a line graph illustrating the relationship between the turbidity of the polymer/water mixture and the filter sequence being utilized.
Figure 8:
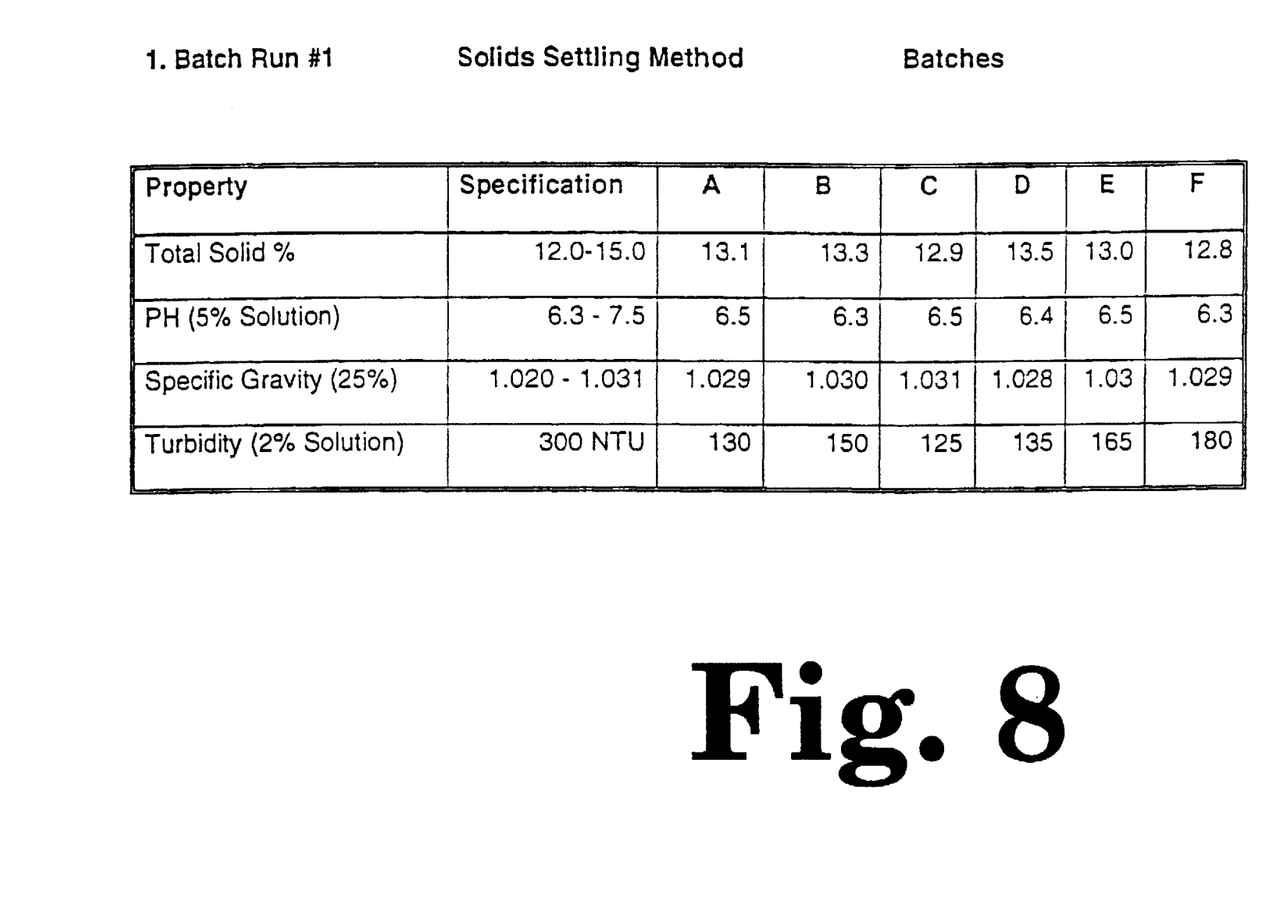
FIG. 8 is a table showing the various physical and chemical characteristics for the final water/polymer mixture after being processed according to the present invention, for a variety of different batches.

As shown diagrammatically in FIG. 1, and as illustrated in FIGS. 2, 4 and 5, the process of the present invention begins with a crude polyester copolymer resin. By "crude," it is meant that the resin, produced via conventional polymerization methods, is made up of polymer particles which vary greatly in size. There are some applications, however, which require that the polymer particles be of the smallest size only. Such applications include, for example, the manufacture of high-grade polyester PET film.

In the first step 50, the crude copolymer resin 12 is mixed with an appropriate amount of water 14. For example, a typical range is from about 10 to about 20% solids, more commonly about 12 to about 15% solids.

Next, the mixture 16 of resin 12 and water 14 is heated 52 and agitated thoroughly 54 in order to disperse the dispersible polymer in the mixture. It is expected that a temperature in the range of about 180° to about 200° F. will be sufficient for this. With regard to the agitation, there is no specific requirement, but a high speed mixing for one to two hours generally proves adequate.

Prior to filtering, it is preferred to cool the polymer/water mixture 16, generally to a temperature of from about 65° to about 90° F. 56, although some variance from this range will not significantly affect the efficiency of the process.

At this point, the mixture is then transferred 58 to a settling tank or several settling tanks 22, so that any undispersed particles can settle out of solution 60, forming a sediment 24, which can easily be drained 62 off the bottom of the settling tank, leaving only the desired dispersion 26.

At this point, the mixture 26 is filtered 64 through a continuous serial filter system 32. The filtering system preferred in the process of the present invention consists of a combination of liquid filter bags at various mesh sizes. It is preferred to use a plurality of filter systems, each capable of containing a plurality of filter bags. In its most preferred embodiment, the process utilizes two filter systems, each capable of containing from 1 to at least 5 filter bags. The mixture 26 is circulated, in a continuous manner, through the filter system, thus removing the copolymer particles large enough to be trapped within the filter bags. With regard to the filter bag mesh size, the first filter system in the process will generally have a mesh size of at least 50 microns.

Over the course of the filtration, the filter bags are preferably changed at periodic intervals, with smaller mesh sizes being used in each subsequent filtration. In addition, it has been found that the process will proceed more efficiently when each filter system in the series contains a filter or filters having a smaller mesh size than the one preceding it. For example, when two filter systems are connected in series, it has been found that, for the initial filter sequence, a first filter having a single filter bag of 100 micron mesh size and a second filter having a single filter bag of 100 to 75 micron mesh size can be effectively employed. When two filter systems are utilized, it is preferred that the second filter system utilize filter bags having a mesh size the same as or smaller than the first filter system. As a general guideline, the ratio of the mesh size of the first filter system to the second filter system will most often be between 1:1 and 5:1.

Eventually, these initial filters will have removed all or nearly all of the largest copolymer particles from the mixture, so replacement of the filter bags with smaller mesh size filter bags is in order. For example, in the above instance, it would be appropriate to replace the single 100 and 100 or 75 micron filter bags with single or dual 75 and 50 micron mesh size filter bags, respectively. With regard to the filter bag mesh sizes before and after a filter bag change, it is anticipated that a ratio of the second filter system mesh size before a filter bag change is made to the first filter system mesh size after a filter bag change is made will generally be from 1:1 to 5:1. For example, if a filter sequence is using two filter systems, a first with filter bags of 150 micron mesh size and a second with filter bags of 100 micron mesh size, then after a filter change, the first filter system would most often have filter bags with a mesh size of from 100 microns to 20 microns.

This process, of using progressively smaller mesh size filter bags, can be repeated, for example, down to 1 micron or smaller mesh size. Use of multiple bags in each filter systems improves the efficiency of the process. For example, the intermediate mesh sizes (from about 5 to about 50 microns) can effectively employ up to 5 or more filter bags per unit.

The progress of the filtration can be monitored, for example, by measuring 66 the turbidity of the mixture. As the larger particles are removed by the filtration, the turbidity decreases accordingly. For example, the initial copolymer/water mixture will often have an initial turbidity of about 400 NTU or more, while the final product, after filtering with filter bags from 100 to 1 micron, will often yield a dispersion having a turbidity of 120 NTU or less. It is generally expected that a turbidity value of under 120 NTU will provide a copolymer resin of suitable quality. Accordingly, the turbidity is measured at various intervals. If the turbidity is higher than desired and remains the same or nearly the same over consecutive measurements, then the filter bags should be changed to a smaller mesh size and the filtration continued. Once the turbidity reaches the desired level, however, the resulting dispersion contains copolymer particles of an acceptable size.

EXAMPLE 1

Initially, 12–13.5% of the polyester copolymer resin is slowly added to a reaction kettle containing water at a temperature of 195°–200° F. and mixed at high speed for 1½ to 2 hours, then cooled to 65° to 80° F. and pumped, with agitation to settling tanks. The mixture is allowed to settle for 48 to 72 hours, at which point the settled, undispersed polymer is drummed off of the bottom of the tanks as batch sediment. Agitation is resumed and the mixture is filtered, using series filtration (two units) as shown in Table 1, below, with filter bags varying in mesh size. After a total of about 14 hours of filtering (each filtering run lasting from about 1 to 3½ hours) with filters ranging in micron mesh size from 100 to 1 micron, a finish product with a final turbidity reading of 120 NTU is yielded.

TABLE 1

| Filter 1 | | Filter 2 | | Ending | |
|---|---|---|---|---|---|
| Micron Size | # of Bags | Micron Size | # of Bags | Turbidity (NTU) | Time (min.) |
| (initial mixture prior to filtering) | | | | >400 | |
| 100 | 1 | 100 | 1 | 374 | 150 |
| 75 | 1 | 50 | 1 | 352 | 90 |
| 50 | 3 | 25 | 3 | 300 | 210 |
| 25 | 5 | 10 | 5 | 210 | 120 |
| 10 | 3 | 5 | 3 | 177 | 150 |
| 5 | 1 | 5 | 1 | 125 | 60 |
| 2 | 1 | 1 | 1 | 120 | 60 |

It will be understood that each of the elements described above, or two or more together, may also find a useful application in other types of applications differing from the type described above.

While the invention has been illustrated and described as embodied in a process for preparing a dispersion of polyester copolymer resin in water, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by Letters Patent is set forth in the appended claims.

I claim:

1. A process for preparing a dispersion of polyester copolymer resin in water comprising the steps:
   a) combining a crude polyester copolymer resin, having particles of various sizes, with water;
   b) heating said resin/water mixture;
   c) agitating said resin/water mixture;
   d) cooling said mixture;
   e) transferring said mixture to one or more settling vessels;
   f) allowing said mixture to stand undisturbed so that any undispersed particles in said mixture settle out as a sediment;
   g) removing said sediment from said mixture, and
   h) continuously filtering said mixture to remove the largest size resin particles from said mixture.

2. A process as defined in claim 1, wherein said mixture is heated to a temperature of from about 180° to about 200° F. in said heating step.

3. A process as defined in claim 2, wherein said mixture is cooled to a temperature of from about 65° to about 90° F. in said cooling step.

4. A process as defined in claim 3, wherein said filtering step comprises filtering said mixture through a plurality of filter units.

5. A process as defined in claim 4, further comprising the step of measuring the turbidity of the mixture during the filtering process, transferring the mixture to the settling vessel when the turbidity of the mixture falls below a predetermined level.

6. A process as defined in claim 5, wherein each of said filter units contains 1 or more filter bags.

7. A process as defined in claim 6, wherein each of said filter units contains from 1 to 5 filter bags.

8. A process as defined in claim 7, comprising a first and a second filter unit arranged in series.

9. A process as defined in claim 8, wherein said first filter unit contains from 1 to 5 filter bags having a first mesh size and said second filter unit contains from 1 to 5 filter bags having a second mesh size, wherein said second mesh size is the same as or smaller than said first mesh size.

10. A process as defined in claim 9, wherein the ratio of said first mesh size to said second mesh size is from 1:1 to 5:1.

11. A process as defined in claim 10, wherein said filtering step further comprises periodically changing said filter bags in said filter units so that said filtering step utilizes an initial filter bag mesh size for each filter unit, a final filter bag mesh size for each filter unit, and a plurality of intermediate filter bag mesh sizes for each filter unit.

12. A process as defined in claim 11, wherein said final filter bag mesh size for said second filter unit is 1 micron or less.

13. A process as defined in claim 12, wherein said initial filter bag mesh size for said first filter unit is 75 microns or greater.

14. A process as defined in claim 13, wherein the ratio of the second mesh size before a filter bag change is made to the first mesh size after a filter bag change is made is from 1:1 to 5:1.

15. A process as defined in claim 1, wherein said mixture is cooled to a temperature of from about 65° to about 90° F. in said cooling step.

16. A process as defined in claim 1, wherein said filtering step comprises filtering said mixture through a plurality of filter units.

17. A process as defined in claim 1, further comprising the step of measuring the turbidity of the mixture during the filtering process, transferring the mixture to the settling vessel when the turbidity of the mixture falls below a predetermined level.

18. A process as defined in claim 16, wherein each of said filter units contains 1 or more filter bags.

19. A process as defined in claim 18, wherein each of said filter units contains from 1 to 5 filter bags.

20. A process as defined in claim 19, comprising a first and a second filter unit arranged in series.

21. A process as defined in claim 20, wherein said first filter unit contains from 1 to 5 filter bags having a first mesh size and said second filter unit contains from 1 to 5 filter bags having a second mesh size, wherein said second mesh size is the same as or smaller than said first mesh size.

22. A process as defined in claim 21, wherein the ratio of said first mesh size to said second mesh size is from 1:1 to 5:1.

23. A process as defined in claim 22, wherein said filtering step further comprises periodically changing said filter bags in said filter units so that said filtering step utilizes an initial filter bag mesh size for each filter unit, a final filter bag mesh size for each filter unit, and a plurality of intermediate filter bag mesh sizes for each filter unit.

24. A process as defined in claim 23, wherein said final filter bag mesh size for said second filter unit is 1 micron or less.

25. A process as defined in claim 24, wherein said initial filter bag mesh size for said first filter unit is 75 microns or greater.

26. A process as defined in claim 25, wherein the ratio of the second mesh size before a filter bag change is made to the first mesh size after a filter bag change is made is from 1:1 to 5:1.

* * * * *